United States Patent [19]

Keyt et al.

[11] 4,317,136
[45] Feb. 23, 1982

[54] FACSIMILE SYSTEM

[75] Inventors: F. Gene Keyt, Trumbull; Donald J. Illk, Stamford, both of Conn.

[73] Assignee: Pitney Bowes Inc., Stamford, Conn.

[21] Appl. No.: 74,699

[22] Filed: Sep. 12, 1979

[51] Int. Cl.³ .................................................. H04N 1/32
[52] U.S. Cl. ...................................... 358/256; 358/257; 358/258
[58] Field of Search ............... 358/257, 258, 142, 256; 340/734, 732, 736; 364/515

[56] References Cited

U.S. PATENT DOCUMENTS

| | | | |
|---|---|---|---|
| 2,483,449 | 10/1949 | Wise et al. | 358/257 |
| 2,730,563 | 1/1956 | Karch | 358/257 |
| 2,894,063 | 7/1959 | Ridings et al. | 358/257 |
| 3,241,120 | 3/1966 | Amdahl | 340/732 |
| 3,566,361 | 2/1971 | Lavertu et al. | 340/734 |
| 3,678,180 | 7/1972 | Bond | 358/257 |
| 3,706,842 | 12/1972 | Robertson | 358/257 |
| 3,798,610 | 3/1974 | Bliss et al. | 340/732 |
| 3,872,462 | 3/1975 | Lemelson | 340/734 |
| 3,936,664 | 2/1976 | Sato | 340/732 |
| 4,058,838 | 11/1977 | Crager et al. | 358/257 |
| 4,135,214 | 1/1979 | Weber | 358/261 |
| 4,187,520 | 2/1980 | Beduchard | 358/258 |

FOREIGN PATENT DOCUMENTS 1493897 11/1977 United Kingdom .

Primary Examiner—Benedict V. Safourek
Assistant Examiner—Edward L. Coles
Attorney, Agent, or Firm—Donald P. Walker; William D. Soltow, Jr.; Albert W. Scribner

[57] ABSTRACT

In a facsimile communication system there is provided a transmitter for transmitting facsimile information, the facsimile information including at least one document format each having a different address; and a receiver for receiving facsimile information, including a memory for storing the at least one document format in digital data form and for reading out stored digital data. In addition there is provided a transmitter for transmitting alpha-numeric data, including apparatus for respectively identifying a plurality of unique portions of alpha-numeric data with an address corresponding to a selected document format address; and a receiver for receiving alpha-numeric data, including apparatus for integrating the data of each of the identified portions of data with the data of the correspondingly addressed document format. And, there is provided a printer for printing the integrated data in document form.

8 Claims, 1 Drawing Figure

FACSIMILE SYSTEM

BACKGROUND OF THE INVENTION

As discussed in U.S. Pat. No. 2,894,063, issued July 7, 1959 to G. H. Ridings et al, it is known in the art to provide a facsimile system including a control center and outlying office, wherein the outlying office includes a facsimile recorder provided with a supply of pre-printed tickets or coupons, or the like, which must be validated before issuance, and wherein the control center includes a facsimile transmitter which transmits facsimile signals to the outlying office for recordation on the tickets, coupons, or the like, to validate the same for issuance. Such conventional facsimile systems are relatively slow and expensive to operate since a very large number of bits of information must be processed to provide reasonable resolution. For example, almost three and three-quarters of a million bits of information must be processed to achieve 200 dots per inch resolution on an 8½" by 11" document. And, although the number of such bits may be dramatically reduced as discussed in the aforesaid patent to reduce signal transmission time, a facsimile recorder which utilizes pre-printed forms cannot be recycled with sufficient rapidity to quickly and inexpensively produce, for example, ten thousand tickets bearing different pricing information. Thus the inherently slow speed recycling capabilities of such conventional facsimile equipment renders the same incompatable for use in high-speed communications systems. Accordingly:

An object of the present invention is to provide an improved facsimile communications system; and Another object is to modify a conventional facsimile communication system for use in a high-speed communications system.

SUMMARY OF THE INVENTION

In a facsimile communication system, there is provided the combination comprising: means for transmitting facsimile information, wherein the facsimile information includes at least one document format, each of which has a different address; and means for receiving facsimile information including means for storing said at least one document format in digital data form. In addition, the combination comprises: means for transmitting alpha-numeric data, including means for respectively identifying a plurality of unique portions of alpha-numeric data with an address corresponding to a selected document format address; and means for receiving alpha-numeric data, including means for respectively integrating the data of each of the identified portions of data with the data of the correspondingly addressed document format. And the combination includes means for printing the integrated data in document form.

BRIEF DESCRIPTION OF THE DRAWINGS

As shown in the drawing, wherein like reference numerals designate like or corresponding parts.

DESCRIPTION OF THE PREFERRED EMBODIMENTS

Figure 1:
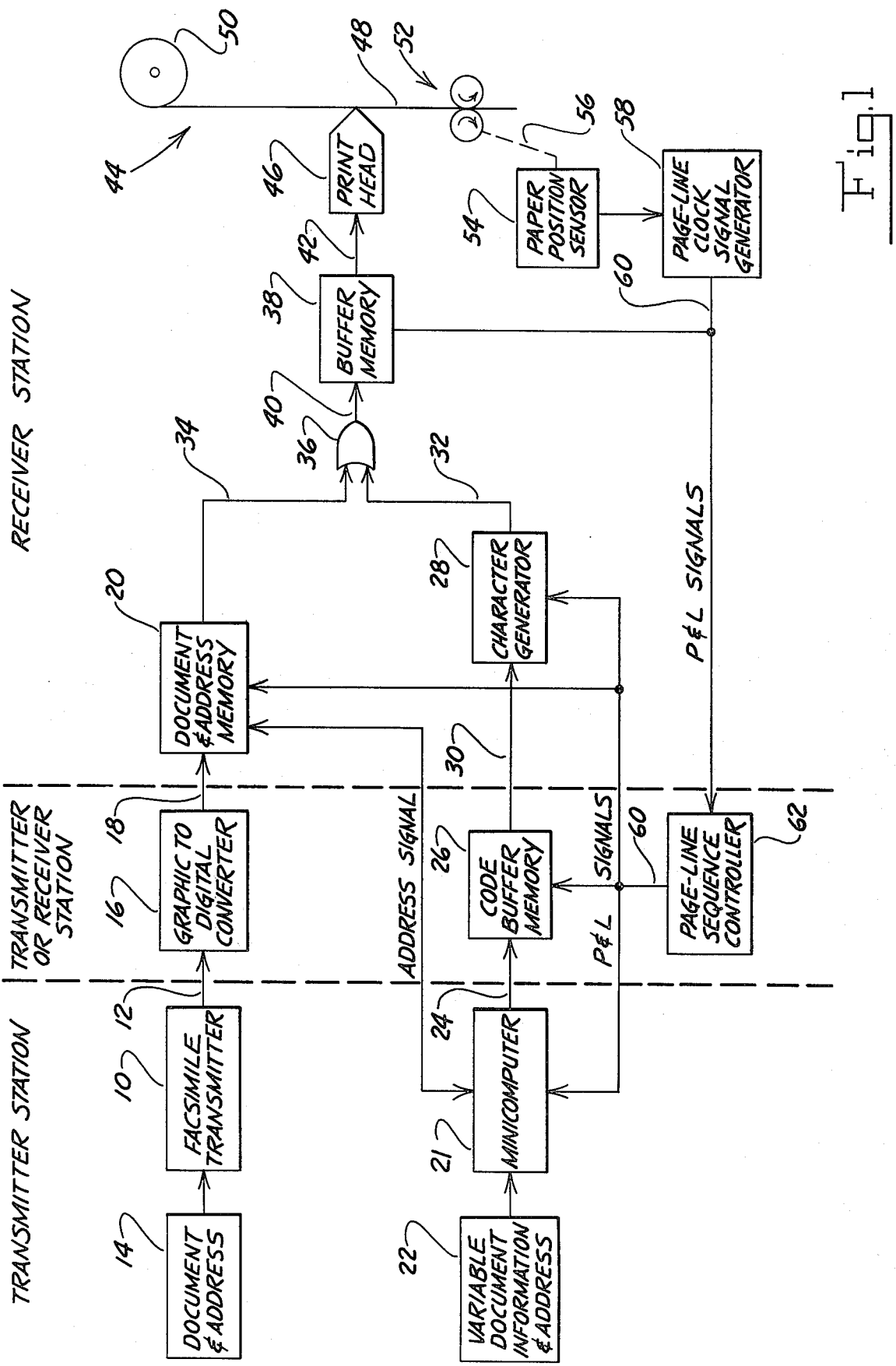
FIG. 1 is a schematic circuit diagram showing a facsimile communication system in accordance with the invention.

As shown in FIG. 1, a facsimile communication system in accordance with the invention comprises facsimile signal transmitting means including a conventional facsimile transmitter 10 which is adapted by well-known means for electronically generating a facsimile information signal 12, in analog data form, corresponding to the graphic information typically contained on an 8½" by 11" document 14 optically scanned by the transmitter 10. In the present invention the transmitter 10 is utilized for scanning one or more documents 14 having a fixed format, to which variable information is added for validation or other completion purposes, and having a unique address. The transmitter 10 generates a suitable number of analog data bits, such as an array of 200 by 200 picture elements or pixels per inch, horizontally and vertically, or 40,000 bits per square inch of the scanned area, to provide for sharp resolution of a facsimile copy of the format of the document 14.

In addition, the facsimile communication system comprises facsimile information receiving means including a conventional analog to digital data signal converter 16 (FIG. 1) coupled by well-known means to the transmitter 10, for receiving the analog data facsimile signal 12 and electronically generating a facsimile information signal 18, in digital data form; wherein one bit of digital data is generated for each analog data bit with a view to preservation of the information content, in the digital data facsimile signal 18, of the high image resolution characteristic of the original analog data facsimile signal 12. Although data compression techniques may be used, it is not essential to the invention to do so.

Preferably the functions of both the facsimile transmitter 10 (FIG. 1) and converter 16 are performed by means of a single unit of facsimile information transmitting apparatus, such as the Rapifax Model 100, high speed, facsimile transceiver commercially available from Ripicom, Inc. of Fairfield, N.J. And, for the purpose of the present invention the transceiver would be utilized for scanning a plurality of documents 14 and generating a corresponding plurality of uniquely addressed, different series of digital data facsimile signals 18 representative of each of the scanned documents 14, the subsequent integration with variable information for validation or other completion purposes prior to printing completed documents as hereinafter discussed.

To facilitate multiple usage of the respective formats of the incomplete documents 14, the facsimile information receiving means preferably includes a conventional electronic memory 20 suitably coupled to the signal converter 16 or transceiver, 10 and 16, as the case may be, for storing digital data facsimile signals 18 therein for read-out purposes. The conventional memory means 20 may include for example a large capacity Random Access Memory, or RAM comprising a sufficient number of Integrated Circuit, or IC, logic chips functionally comparable to a plurality Part No. 93914 TTL Isoplanar RAM IC chips commercially available from the Fairchild Semiconductor Components Group, Fairchild Camera and Instrument Corporation, Mountainview, Calif. hereinafter called Fairchild Corp., to provide for storage of digital data signals 18 representing each of the formats of the scanned documents 14. In which instance each IC chip would have the capability of storing an array of 9 by 64, or 576, bits of digital data, each chip including address decoding circuitry for accessing and reading out the respective bits of data.

The facsimile communication system also comprises alpha-numeric data transmitting means including a conventional minicomputer 21, having alpha-numeric data memory and bit processing circuitry, as for example found in the Model S/250 Minicomputer commercially available from Data General Corporation, Brattleboro, Mass. Preferably, the minicomputer 21 is adapted by well-known means to be pre-programmed for control purposes from a conventional source of digital data and adapted to transmit alpha-numeric data representative of variable document information 22 for completion of respective documents 14; the information 22 being entered by well-known means from a conventional source thereof such as a keyboard entry device, magnetic tape, punched cards, communication lines or word processing equipment, or the like, and includes information for identifying selected portions of variable alpha-numeric data with the address of the document format stored in the memory 20 with which such variable data is to be subsequently integrated. For high-speed transmission purposes, it is preferred that a conventional 8 bit character code signal 24 be generated and utilized for transmission of each alpha-numeric character including any characters identifying the address of the document 14 and line in which the variable document information 22 is to be integrated.

To avoid the cost inherent in a continuously on-line communication system, the alpha-numeric data transmitting means preferably includes conventional means 26 suitably coupled to the minicomputer 21 for receiving the character code signals 24 and for storing one or more lines of characters for completing a document 14. The conventional storing means 26 may include for example a suitable number of Fairchild Part No 93419 RAM IC chips commercially available from Fairchild Corp.; in which instance a single IC chip having a capacity of $9 \times 64$, or 576, bits of information may be provided for retrievably storing a typical character line including 64 characters.

To receive and convert the variable information from 8 bit code form to alpha-numeric data form suitable for integration with the digital data signal representing the incomplete document 14 with which the variable information is to be combined, the facsimile information system preferably includes a conventional character generator 28. The character generator 28 is coupled to the minicomputer 21 or memory 26, as the case may be, to receive variable information therefrom in the form of 8 bit character code signals 24 or 30, as the case may be. And the character generator 28 is pre-programmed by well-known means for storing in digital data form, the respective graphic patterns for the characters of the language being utilized; including, without any intent to limit the generality hereof, upper and lower case letters, numbers, punctuation marks and various symbols such as a dollar sign and percent sign, and mathematical symbols, and the like. The size of the resulting characters is a matter of choice as long as they correspond to the scale needed for integration with the incomplete document format 14. For the English language a standard set of 96 of such characters are ordinarily used; in which instance the character generator 28 may include for example 8 Fairchild Part No. 93448 Isoplanar Schottky TTL pre-programmed ROM IC chips, each of which has a storage capacity of 12.8 characters, for a total storage capacity of 102 characters, and each of which includes conventional programmable access and decoding circuitry for reading out the desired character pattern, appropriately scaled and in digital data form, in response to each 8 bit character code signal, 24 or 30, as the case may be, received thereby from the minicomputer 21 or memory 26, as the case may be.

For integrating the variable, alpha-numeric information content of the digital data signal 32 from the character generator 28, with the fixed, facsimile information content of the digital data signal 34 from the memory 20; the facsimile information receiving means preferably includes a conventional OR gate 36 suitably coupled to the generator 28 and memory 20 for receiving and integrating the respective signals 32 and 34 therefrom on a document-page-line by line basis. For example, the conventional OR gate 36 may comprise a plurality of TTL IC chips commerically available from Texas Instrument Corporation, Dallas, Tex.; it being within the scope of the invention to utilize a plurality of Texas Instrument series SN7400 NAND gates conventionally coupled with SN7408 AND gates in an OR gate configuration for digital data integration purposes.

To permit storing one or more document page lines of integrated digital data from the OR gate 36 for subsequent printing purposes, the facsimile information receiving means may include a conventional buffer memory 38, suitably coupled to the OR gate 36 for receiving therefrom one or more document page lines in the form of an integrated digital data signal 40, and temporarily storing the same for printing purposes. In this connection, the conventional buffer memory 38 may comprise a plurality of SN74LS374 TTL IC chips commerically available from Texas Instrument Corporation, Dallas, Tex.; which IC chips act as latches and include conventional preprogrammable storage, access and read-out circuitry suitable for temporarily storing data and reading out one or more document lines in the form of integrated digital data signal 42.

For printing the integrated information content of the digital data signal, 40 or 42, as the case may be, from the OR gate or buffer memory, 36 or 38, as the case may be, the facsimile information receiving means includes conventional high-speed digital data printing means 44, such as a non-impact, Versatec Printer, commercially available from the Versatec Division of Xerox Corporation, Santa Clara, Calif.; which Printer is constructed and arranged for conventional coupling to the OR gate or buffer memory, 36 or 38, as the case may be, to receive therefrom the integrated data singal, 40 or 42, as the case may be. The printing means 44 generally includes a conventional print head 46 to which the signal, 40 or 42, is coupled via well-known means for continuously marking the paper 48 from a paper roll 50 as the paper 48 is timely advanced past the print head 46, by for example a pair of feed rollers 52, for printing completed documents. The printing head 46 may include ink jet printing means, electrostatic printing means in combination with toning means, or laser printing means, or the like. In addition, the printing means 44 includes suitable well-known paper position sensing means 54, conventionally electro-optically coupled by well-known means 56 to the feed rollers 52 for timely sensing the position of the paper 48. In addition the printing means 44 includes a conventional clock signal generating means 58, such as a plurality of SN74161 TTL IC, 4 bit binary counter chips, commercially available from Texas Instruments Corporation, and suitably coupled to the sensing means 54 and cooperative therewith for generating document page and line signals 60 for controlling the various signal processing means of the facsimile communication system. In this connection, the facsimile communication transmitting or receiving means, or both, preferably includes conventional page and line sequence controlling means 62, such as any well-known gate means, coupled to receive page and line clock signals 60 from the signal generator 58 and distribute the same to the various signal processing means of the facsimile system, including to the minicomputer 21, code buffer memory 26, character generator 28, document-address memory 20 and buffer memory 38, as may be necessary for timing signals from the various processing means with the advance of the paper 48, and the particular page and line information, such that the various signals representing the variable document information 22 and the selected document format 14 are properly integrated for producing facsimile copies of completed documents on the paper 48.

In accordance with the objects of the invention there has been described an improved facsimile communication system, and in particular a conventional facsimile system modified for use in a high-speed communication system.

Inasmuch as certain changes may be made in the above described invention without departing from the spirit and scope of the same, it is intended that all matter contained in the above description or shown in the accompanying drawings shall be interpreted in an illustrative rather than limiting sense. And, it is intended that the following claims be interpreted to cover all the generic and specific features of the invention herein described.

What is claimed is:

1. In a facsimile communication system, the combination comprising:
   a. means for transmitting a facsimile information signal, said facsimile information signal including information corresponding to at least one document format, each of said at least one formats having a different address;
   b. means for receiving the facsimile information signal including means for storing the information corresponding to said at least one document format in digital data form, the facsimile information receiving means including means for reading out stored digital data;
   c. means for transmitting alpha-numeric data signals, said alpha-numeric data transmitting means including means for receiving and storing alpha-numeric data signals from at least one source thereof, said alpha-numeric data transmitting means including means for respectively identifying each of a plurality of unique portions of the alpha-numeric data signals with an address corresponding to a selected document format address;
   d. means for receiving the alpha-numeric data signals, said alpha-numeric data receiving means including means for converting alpha-numeric data to facsimile data in digital form, said alpha-numeric data receiving means including means for respectively integrating the converted data of each of the identified portions of data with the stored digital data of the correspondingly addressed document format; and
   e. means coupled to the integrating means for printing the integrated data in document form.

2. The combination according to claim 1, wherein the facsimile information transmitting means includes a facsimile machine for generating a graphic information signal representing information on a document having a fixed format, said facsimile information transmitting means including means for converting the graphic information signal to a facsimile information signal in digital data form, said facsimile information receiving means adapted to receive the facsimile information signal in said digital data form.

3. The combination according to claim 1, wherein the facsimile information transmitting means includes a facsimile machine for generating a graphic information signal representing a document having a fixed format, and said facsimile information receiving means including means for converting the graphic information signal to a facsimile information signal in digital data form.

4. The combination according to claim 1, wherein said alpha-numeric data transmitting means includes means for storing said alpha-numeric data.

5. The combination according to claim 1, wherein said printing means includes means for storing facsimile information in digital data form.

6. The combination according to claim 1, wherein said printing means includes paper position sensing means, said printing means including means for generating a plurality of signals respectively representative of a different line of data to be printed, and said printing means including means for controlling the respective lines of the document form on which integrated data is printed.

7. The combination according to claim 1, wherein said alpha-numeric data receiving means includes means for storing said alpha-numeric data.

8. The combination according to claim 7, wherein said controlling means includes means for controlling the respective lines of the document format on which digital data is stored.

* * * * *